United States Patent [19]

Reytblatt

[11] 4,123,158

[45] Oct. 31, 1978

[54] PHOTOELASTIC STRAIN GAUGE

[76] Inventor: Zinovy V. Reytblatt, 3550 N. Lake Shore Dr., Chicago, Ill. 60657

[21] Appl. No.: 576,197

[22] Filed: May 9, 1975

[51] Int. Cl.$^2$ ............................................. G01B 11/18
[52] U.S. Cl. .................................... 356/32; 73/800
[58] Field of Search ................................ 356/32–35; 73/88 R, 88 A, 89

[56] References Cited

U.S. PATENT DOCUMENTS

| 1,397,541 | 11/1921 | Owens | 73/88 R |
| 2,945,958 | 7/1960 | Morris | 250/571 |
| 2,946,992 | 7/1960 | Broido | 250/571 |
| 3,077,813 | 2/1963 | Zandman | 356/34 |

FOREIGN PATENT DOCUMENTS

| 38,399 | 1971 | Japan | 356/201 |
| 1,025,468 | 4/1966 | United Kingdom | 73/88 A |

Primary Examiner—John K. Corbin
Assistant Examiner—Wm. H. Punter
Attorney, Agent, or Firm—Vogel, Dithmar, Stotland, Stratmen & Levy

[57] ABSTRACT

There is disclosed a photoelastic strain gauge which displays visual patterns representative of the strain in the workpiece to which the gauge is bonded. The gauge comprises two sheets of reflective material and a body of photoelastic material therebetween. A reflector in the body directs polarized light in such a way as to be reverberated between the reflective sheets and then discharged to produce the visual patterns. Because the light is reverberated, the visual patterns are amplified or enlarged.

26 Claims, 32 Drawing Figures

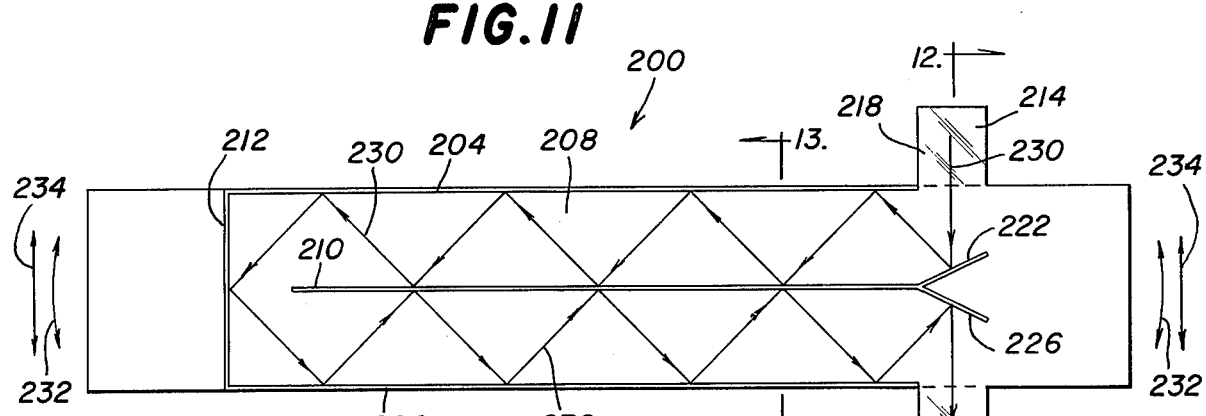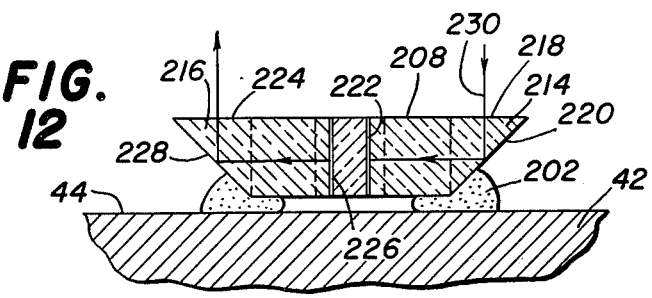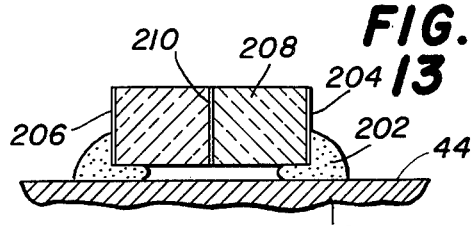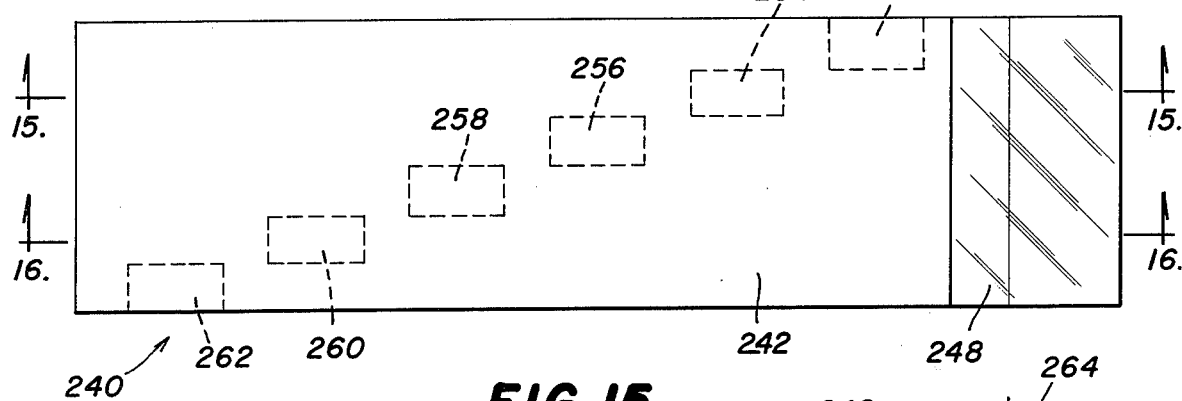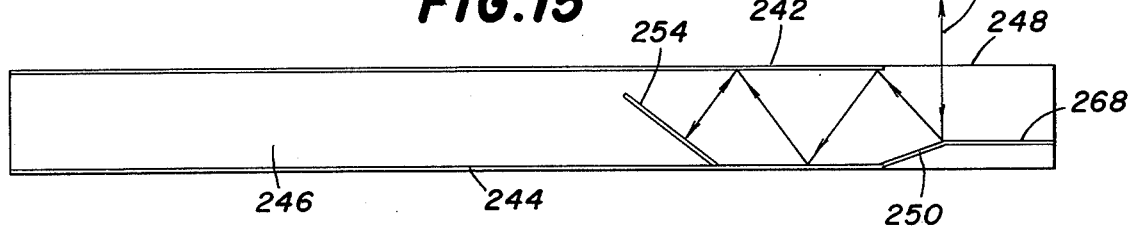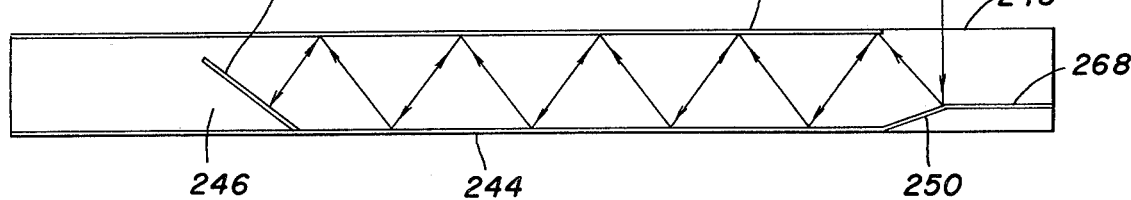

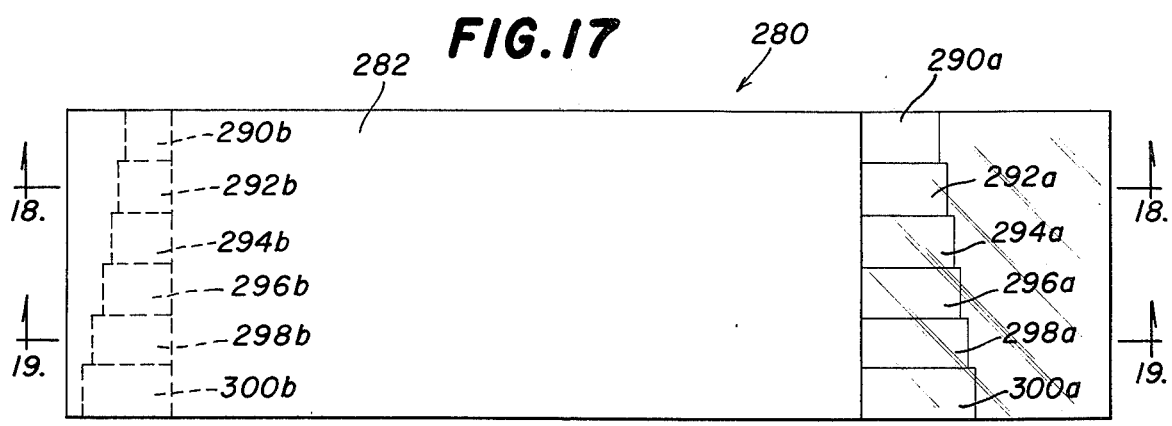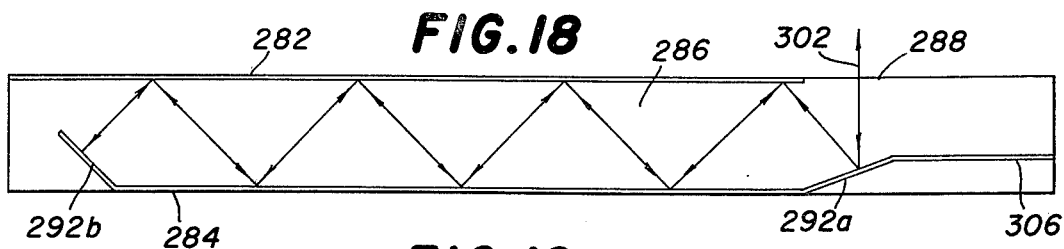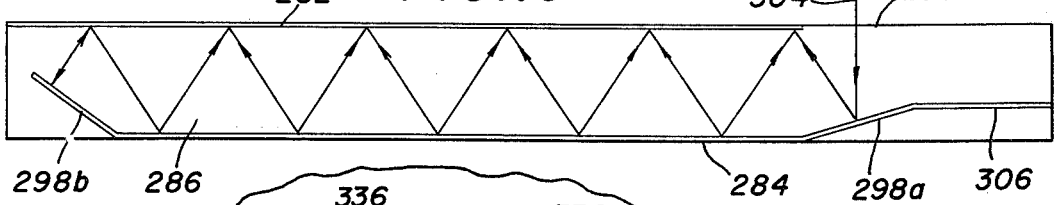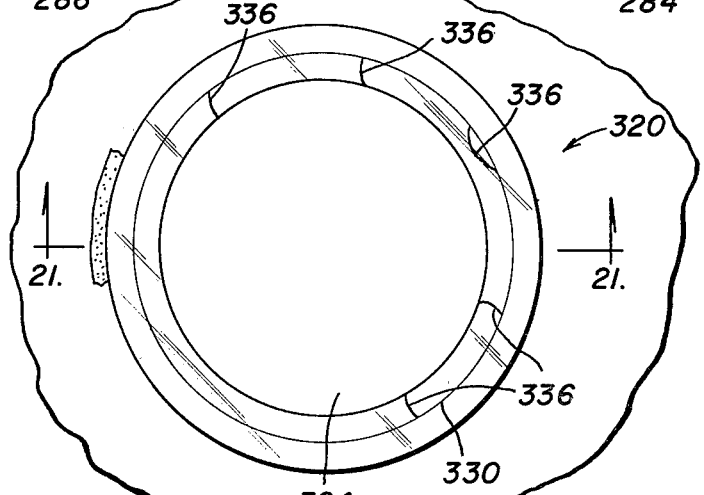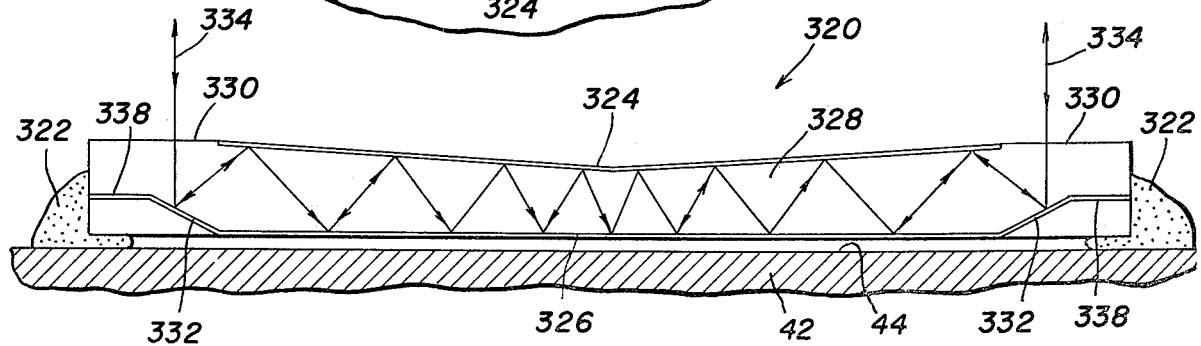

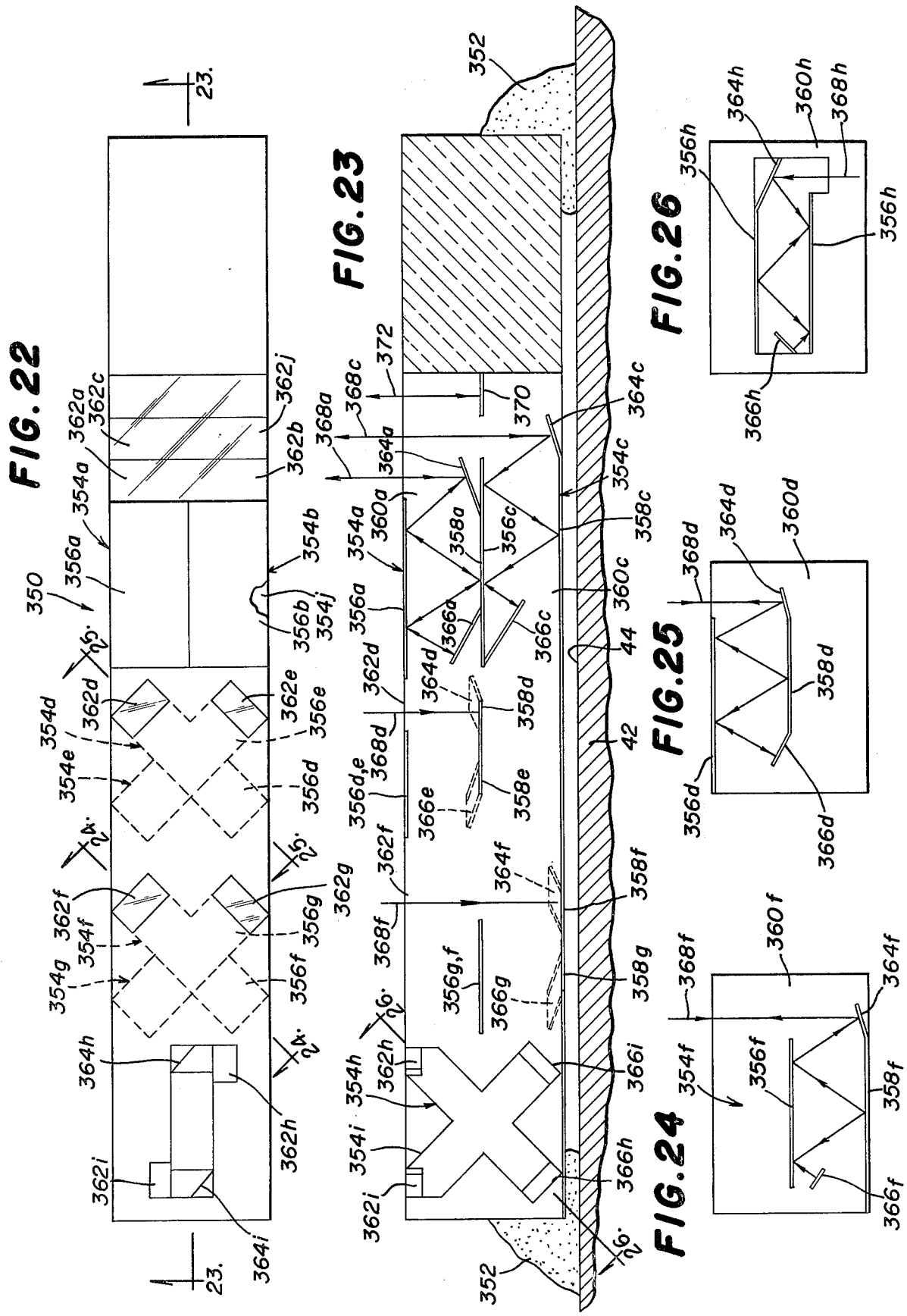

PHOTOELASTIC STRAIN GAUGE

BACKGROUND OF THE INVENTION

There have been various photoelastic strain gauges which have been commercialized and/or the subject of patents. Such gauges are characterized by having a body of photoelastic material which may be in the form of a plate or a slab, for example, and have one of a variety of shapes, such as, rectangular or cylindrical. Photoelastic material has the optical properties of polarizing light when under stress and then transmitting such light on the principal stress planes with velocities depending on the stresses, the latter being known as birefringence. The photoelastic material is clear, elastic and should be homogeneous, optically isotropic when under no stress or strain, and reasonably free from creep, aging and edge disturbance. Examples of photoeleastic material are Bakelite, celluloid, gelatin, synthetic resins, glass, and other such commercial products that are optically sensitive to stress and strain.

When the gauge is subject to monochromatic polarized light, the birefringence of the photoelastic material causes the light to emerge refracted in two orthogonal planes. Because the velocities of light propagation are different in each direction, there occurs a phase shifting of the light waves. When the waves are recombined with polarizing film, regions of stress where the wave phase is canceled appear black, and regions of stress where the wave phase is combined appear light. When white light is used in place of monochromatic light, the relative retardation of the photoelastic material causes the fringes to appear in colors of the spectrum.

There are a number of extant patents found in this broad category of photoelastic stain gauges, such as: U.S. Pat. Nos. 2,985,748 issued to Mendelsohn; 3,034,395 issued to Zandman; 3,067,606 issued to Oppel; 3,074,271 issued to Redner; 3,077,813 issued to Zandman; 3,198,063 issued to Redner; and 3,216,312 issued to Oppel. Each of these patents discloses a photoelastic strain gauge which displays visual patterns representative of the strain in a workpiece to which the gauge is bonded. One skilled in the "reading" of such gauges can evaluate quantitatively and/or qualitatively, the stress in the workpiece. Such prior art devices are quite adequate for evaluating the relatively large value stresses that are usually encountered. However, in certain instances, when the stress is minute, for example, on the order of $10^{-5}$, these prior art gauges are deficient. Specifically, the visual patterns produced as the result of such small stresses are virtually indetectable.

SUMMARY OF THE INVENTION

It is therefore a most important object of the present invention to provide an improved photoelastic strain gauge capable of displaying patterns representative of stresses of very small value.

In summary, there is provided a photoeleastic strain gauge adapted to be bonded to a surface of a workpiece for displaying visual patterns representative of the strain in such workpiece, the photoelastic strain gauge comprising two sheets of reflective material, a body of photoelastic material between the reflective sheets, the body having an entry aperture for light to enter the body and an exit aperture arranged to receive light which has passed through the body to produce the visual patterns, and means for receiving light which has passed through the entry aperture and for directing such light at a predetermined angle so as to be reverberated within the body between the reflective sheets and to the exit aperture, thereby to increase the length of the paths of light through the body so as to cause the visual patterns to be amplified.

BRIEF DESCRIPTION OF THE DRAWINGS

FIG. 5 is a view like FIG. 3, but, in order not to confuse the drawing, the cross hatching in the center piece 52b has been deleted;

FIG. 11 is a top plan view of a further embodiment of the present invention;

FIG. 12 is a view in vertical section taken along the line 12—12 of FIG. 11;

FIG. 13 is a view in vertical section taken along the line 13—13 of FIG. 11;

FIG. 14 is a top plan view of a still further embodiment of the present invention;

FIG. 15 is a view in vertical section taken along the line 15—15 of FIG. 14;

FIG. 16 is a view in vertical section taken along the line 16—16 of FIG. 14;

FIG. 17 is a top plan view of a yet further embodiment of the present invention;

FIG. 18 is a view in vertical section taken along the line 18—18 of FIG. 17;

FIG. 19 is a view in vertical section taken along the line 19—19 of FIG. 17;

FIG. 20 is a top plan view of another embodiment of the present invention;

FIG. 21 is a view in vertical section taken along the line 21—21 of FIG. 20, but on an enlarged scale;

FIG. 22 is a top plan view of still another embodiment of the present invention.

FIG. 23 is a view in vertical section taken along the line 23—23 of FIG. 22;

FIG. 24 is a view in vertical section taken along the line 24—24 of FIG. 22;

FIG. 25 is a view in vertical section taken along the line 25—25 of FIG. 22;

FIG. 26 is a view in vertical section taken along the line 26—26 of FIG. 23;

DESCRIPTION OF THE PREFERRED EMBODIMENT

Figure 1:
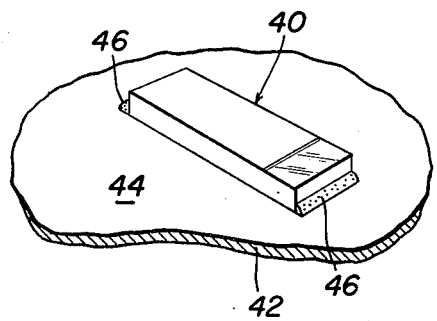
FIG. 1 depicts a photoelastic strain gauge incorporating the features of the present invention, which gauge is bonded to a workpiece of which a fragmentary portion is shown.

Turning now to FIG. 1, there is depicted a photoelastic strain gauge 40 which incorporates the features of the present invention, for displaying visual patterns representative of the stress in a workpiece 42. The strain gauge 40 is bonded to the surface 44 of the workpiece 42 by cement 46 or by any other suitable means. As will be explained in detail hereinafter, the gauge 40 is illuminated by a polarized light on which the gauge 40 acts. The stress in the workpiece 42 is transmitted to the gauge 40 which affects the light characteristics of the gauge to cause the visual patterns to be representative of such stress.

Figure 2:
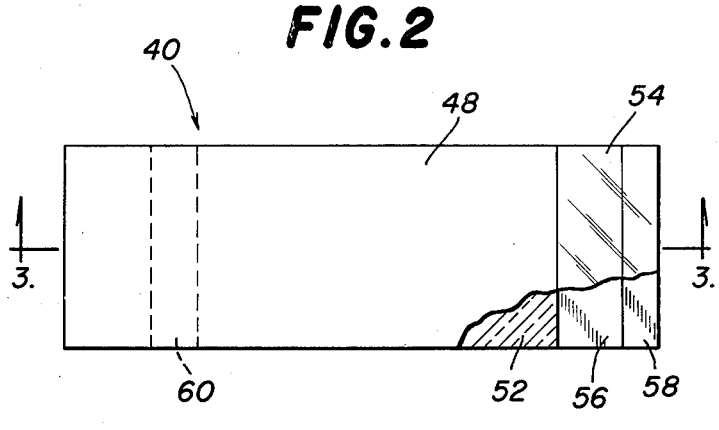
FIG. 2 is a top plan view on an enlarged scale of the photoelastic strain gauge of FIG. 1, with a portion cut away to expose the interior.
Figure 3:
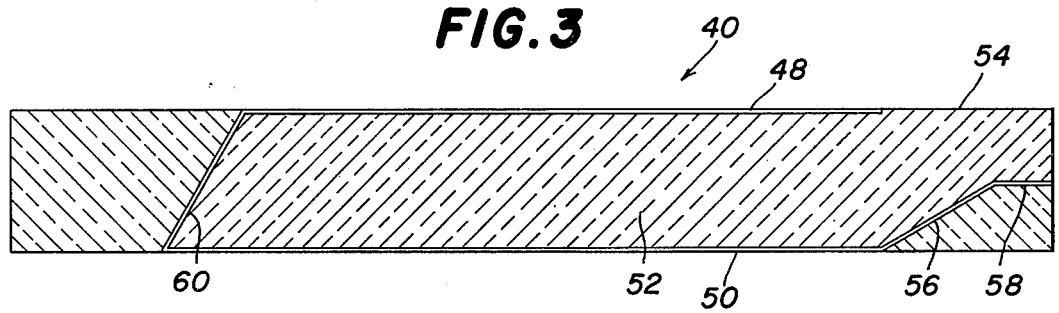
FIG. 3 is a view in vertical section taken along the line 3—3 of FIG. 2, but on an enlarged scale.

Turning now to FIGS. 2 and 3, the construction of the photoelastic strain gauge 40 will be described. The gauge 40 comprises a top sheet of reflective material 48, a bottom sheet of reflective material 50 and a body or a slab 52 of photoelastic material between the reflective sheets 48 and 50. In the particular form illustrated in FIGS. 2 and 3, the sheets 48 and 50 are actually formed by metalizing a reflective substance directly onto the opposing surfaces of the slab 52. As viewed in FIG. 3, the right-hand end of the upper surface of the slab 52 does not have a reflective material thereon. Such nonreflective portion constitutes a window or aperture 54 which serves to enable light to enter into the slab 52 and also for light in the slab 52 to exit therefrom.

The gauge 40 further comprises an initial reflector 56 oriented at a predetermined angle to the sheet 50. The sheet 50 is parallel to the mounting plane of the gauge 40, which will be explained in greater detail hereinafter. There is also provided a further reflector 58 which is planar, like the reflector 56, and is substantially parallel to the reflective sheet 50, that is, parallel to the aforementioned mounting plane. Finaly, the gauge 40 includes a terminal or end reflector 60 also at a predetermined angle to the mounting plane or the reflective sheet 50. By suitable calculation, it can be shown that the angle of the reflector 60 to the mounting plane is twice the angle between the reflector 56 and the mounting plane.

Figure 4:
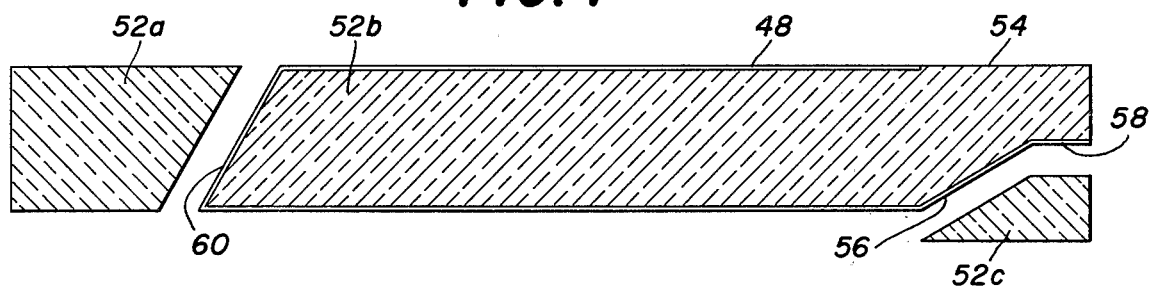
FIG. 4 is an exploded view of the section depicted in FIG. 3 in order to depict an exemplary way to make the strain gauge of the present invention.

FIG. 4 depicts an exemplary manner in which the gauge 40 can be constructed. It may be made in three separate pieces 52a, 52b and 52c, each having the configuration depicted. Then by well-known techniques, a reflective material is deposited on most of the exterior surface of the central or large piece 52b to provide the reflective sheets 48 and 50 and the reflectors 56, 58 and 60. Then the piece 52a is fitted into place and permanently secured to the piece 52b. Similarly, the piece 52a is permanently secured to the piece 52b.

Figure 5:
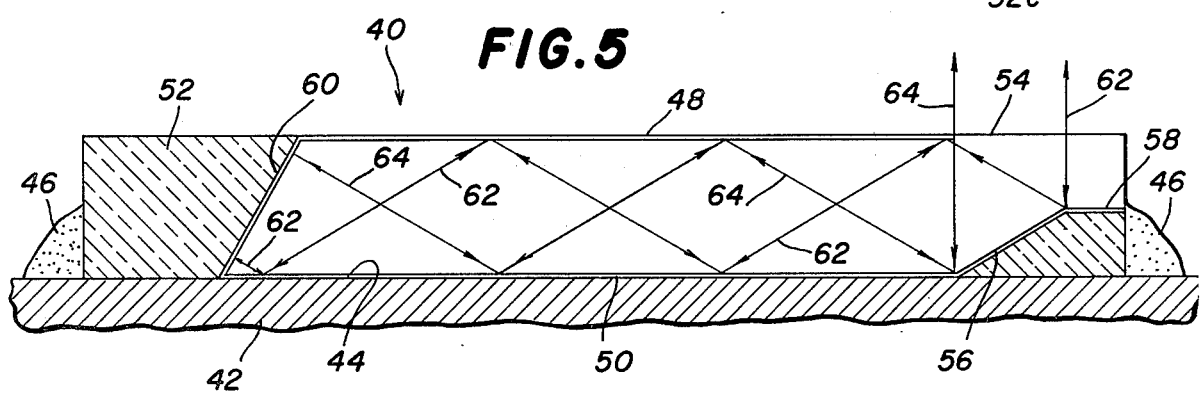
FIG. 5 depicts a vertical section of the gauge mounted on a workpiece, and the paths of light rays through the gauge.

FIG. 5 illustrates the manner in which the strain gauge 40 operates. A light ray 62 enters the slab 52 through the aperture 54, to strike the reflector 56, which reflects the light so that its angle of reflection equals the angle of incidence. Such reflected ray strikes the top reflective sheet 48 from which it is reflected to the lower bottom sheet 50 and then reflected to the top sheet 48, etc. The ray 62 will continue to be reflected back and forth between the reflective sheets 48 and 50, that is, reverberated therebetween until the ray 62 ultimately strikes the reflector 60 perpendicular thereto, whereby the ray 62 is retroreflected by the surface 60 so as to traverse the same path back toward the starting point. It should be understood that the ray tracing in FIG. 5 is schematic, that is, the number of reverberations are likely to be a great deal more than that shown. The ray 62 ultimately strikes the right-hand-most region of the reflector 56, which reflects the ray through the aperture 54. A second ray 64 strikes the left-hand-most region of the reflector 56, which reflects the ray in a similar fashion toward the reflective sheet 48, whereupon the ray 64 reverberates between the sheets 48 and 50 and is retroreflected by the reflector 60 to traverse the same path, striking the reflector 56 and emerging through the aperture 54 as indicated.

The rays 62 and 64 were selected because they define the extremes of the aperture 54. As may be understood, rays between the rays 62 and 64 will be acted upon in a similar fashion. It is significant to note that the aperture 54 serves not only as an entrance for the light, but also as an exit for light emerging from the photoelastic strain gauge 40.

The light rays 62 and 64 are representative of a beam of polarized light obtained by passing light through a polarizing device.

The gauge 40 is bonded to the workpiece 42 by means of the cement 46. The "mounting plane" of the gauge 40 is parallel to the workpiece surface 44, and is therefore parallel to the reflective sheets 48 and 50. The velocities of the light rays 62 and 64 are dependent upon the stresses in the workpiece 42 because of the birefringent characteristics of the strain gauge 40. The light beam represented by the rays 62 and 64 emerging from the gauge 40 is passed through a polarizer whereupon one can view the resultant visual patterns. One skilled in this area can analyze these visual patterns quantitatively and/or qualitatively.

The significant aspect of the invention just described is that it lengthens the path of light through the photoelastic material, thereby causing great amplification of the visual patterns. Whereas minute stresses in the workpiece 42 were not visible using the prior art photoelastic strain gauges, they become readily visible using the present invention, by virtue of the amplification achieved in causing the length of the light paths to be increased by reverberating the rays between the reflective surfaces 48 and 50. As an example, the subject invention may be 50 times as sensitive as prior art strain gauges, being capable of evaluating stresses on the order of $10^{-6}$.

The width of the aperture 54 (the distance between the rays 62 and 64), must be at least the height of the gauge (distance between the reflective sheets 48 and 50), multiplied by the cotangent of the angle formed by the reflector 56 and the mounting plane. If the width of the aperture 54 and the projection into the mounting plane of the reflector 56 are less than that value, then rays entering at the right edge, for example, would be reflected by the reflector 56 to strike a portion of the top surface of the slab 52 which does not have a reflective surface thereon.

The amplification may be increased by reducing the angles of the reflectors 56 and 60. The smaller these angles are, the greater the length of the paths traversed by the light rays. If the angle of the reflector 56 approached 0, the length of the path would approach infinity. However, based on the relationship, between aperture width and the angle of the reflector 56, the smaller the angle, the smaller must be the width of the window.

A reflector 58, which is parallel to the mounting plane or the reflective sheet 50, may be used to convert the gauge 40 into the usual, nonamplifying gauge, in which case, the gauge 40 may be used in the manner described in U.S. Pat. No. 3,034,395 to Zandman.

Figure 6:
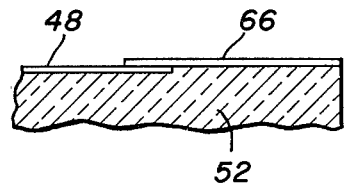
FIG. 6 shows an alternate form in which a polarizing film has been added.

FIG. 6 depicts a modification of the embodiment depicted in FIGS. 1 to 5, in that a polarizing film 66 is affixed to the nonreflective upper surface of the slab 52, that is, coextensive with the aperture 54. In such case, no source of polarized light is necessary. The gauge may be used in the presence of ordinary, incandescent light which is polarized by the film 66 prior to entry into the slab 52 to be processed as described above. The light is then again polarized by the film 66 after emergence from the slab 52.

Figure 7:
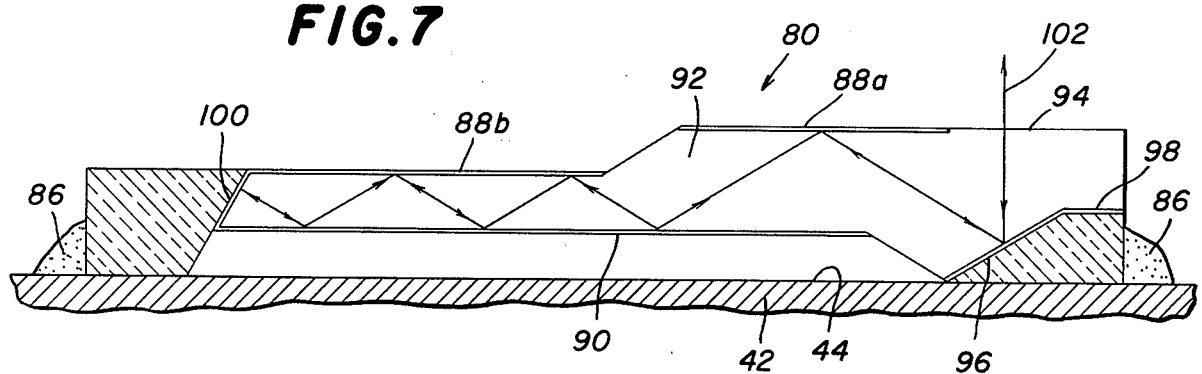
FIG. 7 depicts another embodiment of the present invention in which portions of the photoelastic material have been cut away.

Turning now to FIG. 7, there is depicted a photoelastic strain gauge 80 constituting another embodiment of the present invention. The gauge 80 has the same basic construction as the gauge 40, but with the left-hand portion thinner to conserve photoelastic material. The gauge 80 is bonded to the workpiece 42 by means of cement 86. The gauge 40 comprises upper sheets of reflective material 88a and 88b and a lower sheet of reflective material 90. Disposed between the sheets 88a and 88b, on the one hand, and 90 on the other, is a slab 92 of photoelastic material having the general shape shown. That is to say, the half closest to the entry-and-exit end of the gauge is relatively thick, while the other half is relatively thin. The portion of the top surface of the slab 92 which does not have reflective material therein defines an aperture 94. A reflector 96 is provided in the slab 92 aligned with the aperture 94. At the other end of the slab 92 is a reflector 100 at a predetermined angle to the mounting plane (the plane of the gauge 80 parallel to the plane in contact with the workpiece surface 44).

A light ray 102 will enter through the aperture 94 to strike the reflector 96 which redirects the light ray to be reverberated between the reflective sheets 88a and 88b, on the one hand, and the sheet 90, on the other, to strike the reflector 100 and to be retroreflected thereby to traverse the same path and eventually exit from the slab 92 via the aperture 94. Other rays which enter the aperture 94 will similarly be acted upon by the gauge 80.

The light rays entering the gauge 80 must be polarized, and the light rays leaving the gauge must also be polarized, as explained in respect to the first embodiment. The resultant visual patterns appearing in the aperture 94 will be dependent on the stresses in the workpiece 42 because of the birefringent characteristics of the strain gauge 80.

Figure 8:
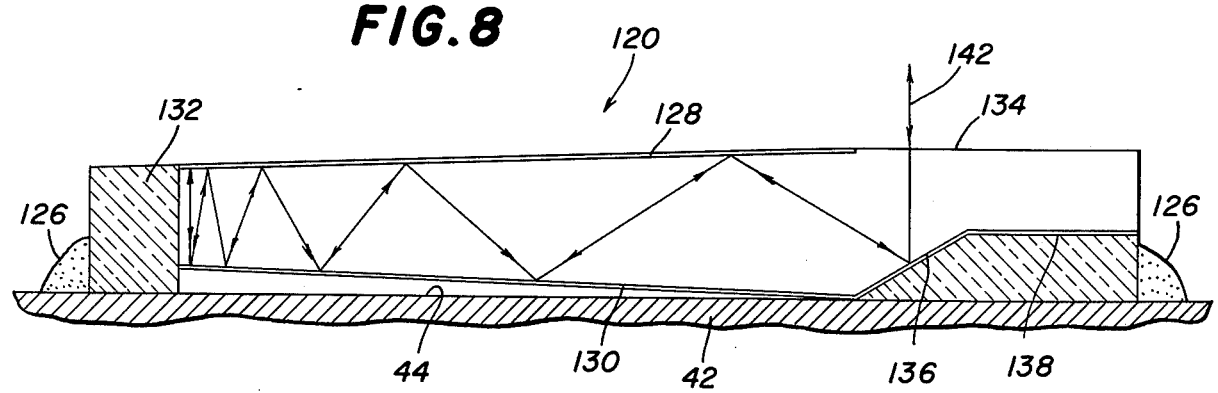
FIG. 8 is a view in vertical section of still another embodiment of the present invention.

Turning now to FIG. 8, there is depicted a strain gauge 120 incorporating still another embodiment of the present invention. The strain gauge 120 includes a pair of sheets of reflective material 128 and 130 that converge from one end toward the other end. A wedge-shaped body of photoelastic material 132 is disposed between the sheets of reflective material 128 and 130. As in the previous forms, the central portion of the slab 132 has its crosshatching missing, in order that the light rays may be readily viewed. The left-hand end of the slab 132 protrudes, so that it, along with the right-hand end, provides a planar surface constituting the mounting plane, which is in contact with the workpiece surface 44 and bonded thereto by cement 126. The unmetalized upper region of the slab 132 defines an aperture 134.

The gauge 120 further comprises a reflector 136 aligned with the aperture 134. There is also provided a reflector 138 which is parallel to the mounting plane, and, as in the earlier forms, such reflector 138 may be used when it is desired not to amplify the visual patterns.

A light ray 142 enters the slab 132 via the aperture 134 to strike the reflector 136 and is reflected thereby to the reflective sheet 128, which in turn reflects the ray 142 to the reflective sheet 130, etc., the ray 142 being reverberated between the sheets 128 and 130. Because the reflective sheets 128 and 130 converge, the angle of incidence and the angle of reflection continue to increase as the ray travels toward the left end of the gauge 120 until at some point the ray is traveling substantially perpendicular to the mounting plane and begins to return, that is, traverse the same path toward the right that it traversed toward the left. Ultimately, the returning ray 142 will strike the reflector 136 and be reflected thereby so as to exit through the aperture 134. Other rays entering the aperture 134 will be similarly acted upon, whereby there will appear in the aperture 134 a visual pattern representative of the stress in the workpiece 42. Because of the increased length of the path of light through the gauge 120, these visual patterns will be greatly amplified.

Figure 9:
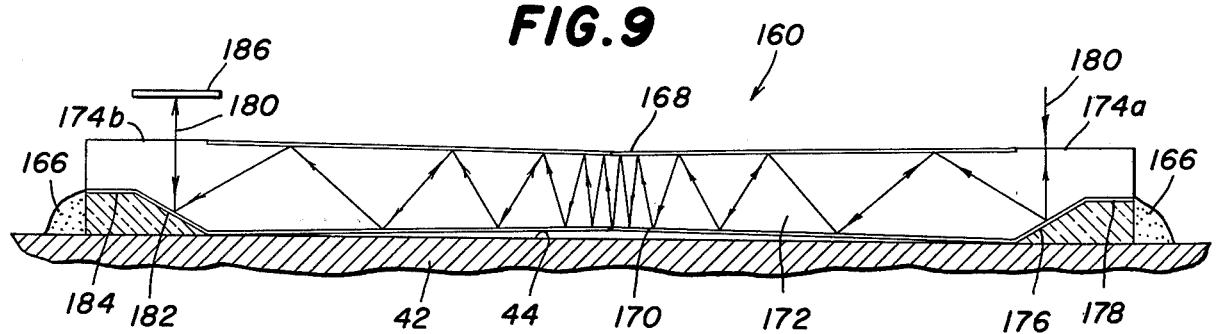
FIG. 9 is a view in vertical section of yet another embodiment of the present invention.

Turning now to FIG. 9, there is depicted a photoelastic strain gauge 160 incorporating yet another embodiment of the present invention. The gauge 160 comprises two sheets of reflective material 168 and 170, each having a shallow V-shaped cross section, with their apexes (intersection of two planar portions of each sheet) being aligned substantially midway between their ends. Between the sheets 168 and 170, is a slab 172 of photoelastic material having a decreasing height or thickness from right to left to the center of the gauge 160, whereat the thickness begins to increase from right to left. Thus, the gauge 160 may be considered to have two wedged-shaped portions with their thin ends abutting. The right-hand portion of the upper surface of the slab 172 does not have a reflective material thereon and constitutes an entry aperture 174a. Aligned with the aperture 174a is a reflector 176. There is also provided reflectors 178 and 184 which are parallel to the mounting plane, that is, the plane of the gauge 160 that contacts the workpiece surface 44. These are used for nonamplification purposes. The gauge 160 is bonded to the workpiece 42 by means of cement 166. The gauge 160 further comprises an exit aperture 174b which is aligned with a terminal reflector 182. An adjustable reflector 186 is positioned in alignment with the aperture 174b.

A light ray 180 which has been polarized, enters the slab 172 via the aperture 174a so as to strike the reglector 176, to be reflected thereby to strike the reflective sheet 168, which in turn reflects the ray 180 to the reflective sheet 170, etc., the ray 180 reverberating between the reflective sheets at increasingly greater angles until the ray 180 is traveling very nearly vertically in the region of the apexes of the sheets 168 and 170. As the ray 180 continues to travel from right to left, the angle formed with the reflective sheets 168 and 170 decreases, until it strikes the reflector 182, which reflects the ray 180 substantially vertically to exit via the aperture 174b and strikes the adjustable reflector 186. The reflector 186 retroreflects the ray 180 in such a way that it strikes the reflector 182 and traverses the same path from left to right that it traversed from right to left, ultimately emerging from the slab 172 through the entry aperture 174a. Other polarized light rays entering the aperture 174a will be similarly acted upon by the gauge 160 to produce patterns in the region of the aperture 174a. Because the stress in the workpiece 42 affects the optical properties of the gauge 160, these visual patterns will be representative of such stress. Because of the increased path length resulting from the reverberation between the sheets 168 and 170, these visual patterns will be greatly amplified in order to give visual representations of minute stresses.

Figure 10:
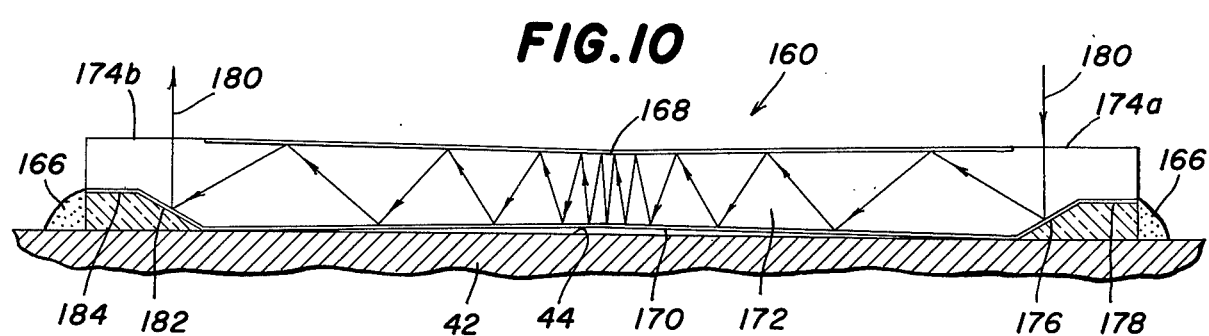
FIG. 10 is a view like FIG. 9 but with the adjustable mirror removed.
Figure 27:
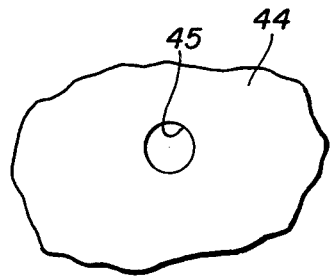
FIG. 27 is a fragmentary view of a workpiece surface having a hole therein to receive a photoelastic strain gauge.
Figure 28:
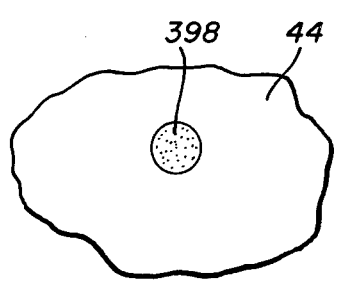
FIG. 28 is a plan view of the hole of FIG. 27 filled with cement.
Figure 29:
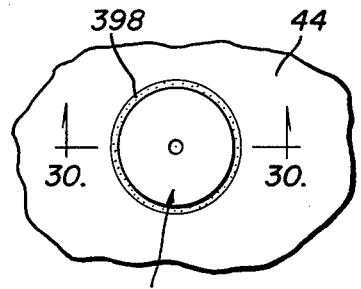
FIG. 29 is a top plan view on an enlarged scale of the filled hole of FIG. 28, with a photoelastic strain gauge incorporating yet another embodiment of the present invention secured therein.

In FIG. 10, the adjustable reflector 186 has been removed, in which case the rays 180 will form the amplified visual patterns in the region of the exit aperture 174b. In this instance, the amplification will be one half as great as that produced by the gauge 160 with the reflector 186 in position, since the length of the path traversed by the rays is one half as long. Without the reflector 186, the gauge 160 can be "read" through the aperture 174a or the aperture 174b, it being understood that the rays could be considered entering the exit aperture 174b and exiting by way of the entry aperture 174a. Preferably, both apertures are simultaneously illuminated, and patterns simultaneously appear in both.

Turning now to FIGS. 11 to 13, there is depicted a photoelastic strain gauge 200 incorporating a further embodiment of the present invention. The gauge 200 includes a pair of outer, elongated sheets of reflective material 204 and 206 and an elongated slab of photoelastic material 208 therebetween. An inner, elongated sheet of reflective material 210 is disposed in the slab 208 and parallel to the outer sheets 204 and 206. Three sheets 204, 206 and 210 are perpendicular to the mounting plane of the gauge 200, that is, the plane parallel to the workpiece surface 44 of the workpiece 42 on which the gauge 200 is mounted by means of cement 202. Adjacent to the left end of the slab 208 is a further sheet of reflective material 212 arranged perpendicular to the sheets 204, 206 and 210. It is to be noted that the end of the sheet 210 is spaced from the sheet 212.

Protruding laterally from the sides of the slab 208, near the right end thereof, is a pair of oppositely directed wings 214 and 216. The top surface of the wing 214 constitutes an entry aperture 218 for light to be admitted into the gauge 200. There is provided a first reflector means including reflectors 220 and 222. The reflector 220 is inclined outwardly at an angle of about 45° to the mounting plane, while the reflector 222 is perpendicular to such mounting plane. The top surface of the wing 216 constitutes an exit aperture 224. Associated with the exit aperture 224 is second reflector means which includes a first reflector 226 that is perpendicular to the mounting plane but angled to the reflective sheet 210, and a reflector 228 at an angle of about 45° to the mounting plane. The second reflector means defined by the reflectors 226 and 228 is laterally aligned with the first reflector means defined by the reflectors 220 and 222.

The inclination of the reflectors 220 and 222, is such as to cause a downwardly directed ray 230 entering the entry aperture 218 to be reflected first by the reflector 220, and then by the reflector 222 toward the reflective sheet 204, which in turn reflects the ray 230 to the inner reflective sheet 210, etc. The ray 230 reverberates between the outer sheet 204 and the inner sheet 210 until it is reflected by the sheet 204 to strike the reflective sheet 212 approximately centrally thereon, which reflects the ray 230 to the other outer sheet 206, which in turn reflects the ray to the inner reflective sheet 210, etc. The ray continues to be reverberated between the other outer sheet 206 and the inner sheet 210 from left to right until the ray strikes the reflector 226 which is oriented to reflect the ray to strike the reflector 228. The reflector 228 reflects the ray substantially vertically out of the exit aperture 224.

There will thus appear in the exit aperture 224 a pattern as the result of the exiting light rays. It is to be understood that in this form, as in the form of FIG. 10, the entry aperture 218 and the exit aperture 224 can be reversed, in which case light entering the exit aperture is operated upon by the gauge 200 to produce a light ray 230. Preferably, both apertures are simultaneously illuminated, so that patterns simultaneously appear in both.

The stress in the workpiece 42 changes or modifies the optical properties of the gauge 200 so as in turn, to affect the paths of the ray 230 and therefore, the visual patterns produced by the gauge 200.

As in the earlier embodiments described, the photoelastic strain gauge 200 is constructed to cause the path of the light rays to be substantially increased so that the visual patterns are amplified. A particular advantage of this embodiment is the low sensitivity to bending and shear stresses. The bending stresses in the workpiece surface 44 are represented by the arrows 232 (FIG. 11). Bending causes the gauge 200 to bow or buckle (toward the top or bottom of the sheet of drawings as viewed in FIG. 11). Such bowing or buckling causes the stress in the section between the reflective sheets 204 and 210 to increase (or decrease) and the stress in the section between the reflective sheets 206 and 210 to decrease (or increase), thereby canceling the effect of bending.

The gauge 200 also has a low sensitivity to shear stresses, which are represented by the arrows 234. The effect of shear stress on all rays directed generally upwardly is canceled by the effect on those rays which are directed generally downwardly, thereby minimizing the effect on the visual patterns by shear stresses.

FIGS. 14–16 depicts a photoelastic strain gauge 240 incorporating a still further embodiment of the present invention. The gauge 240 comprises a top sheet of reflective material 242, a bottom sheet of reflective material 244, and a body or a slab of photoelastic material 246 between the reflective sheets 242 and 244. The righthand end of the upper surface of the slab 246 does not have a reflective material thereon, such nonreflective portion constituting an aperture 248 which serves to enable light to enter into the slab 246 and also for light in the slab 246 to exit therefrom.

The gauge 240 further comprises an initial reflector 250 oriented at a predetermined angle to the sheet 244. The sheet 244 is parallel to the mounting plane of the gauge 240. Also, in the slab 246 is a plurality of reflectors 252 to 262 respectively located at different longitudinal distances from the reflector 250, the reflector 252 being closest and the reflector 262 being farthest. Each of the reflectors 252 to 262 is at the same angle to the mounting plane.

A light ray 264 passing through the aperture 248 will strike the reflector 250 and be reverberated between the reflective sheets 242 and 244, in the manner previously described. If the lateral position of the ray 264 is so as to be longitudinally aligned with the reflector 254, the ray 264 will ultimately strike the reflector 254 to be retroreflected thereby and returned along the same path to exit from the aperture 248. Alternately, a ray 266 which strikes the reflector 250 at a lateral position longitudinally aligned with the reflector 260 will be reverberated between the reflector sheets 242 and 244 ultimately to be retroreflected by the reflector 260 to return along the same path and exit through the aperture 248. The ray 264 traverses a shorter path than the path traversed by the ray 266, whereby the amplification of the visual patterns resulted from the latter is greater. Thus, a ray striking the aperture 248 so as to be longitudinally aligned with the reflector 252 will produce a visual pattern amplified least, the amplification increasing as the reflectors 252-262 respectively come into play. When the entire aperture 248 is illuminated by polarized light, as contemplated, the light will travel through the slab 246 and be reverberated by the reflective sheets 242 and 244 from right to left and will be returned by the reflectors 252 to 262, thereby creating visual patterns in the aperture 248, depending upon the amplification. For example, it may be assumed that the reflector 252 produces an amplification of two; the reflector 254, an amplification of three; the reflector 256, an amplification of four; etc.

The patterns respectively resulting from the reflectors 252 to 262 produce patterns of different orders which a skilled reader can evaluate. Actually, the patterns in each section are not well separated, but instead define a continuous pattern. There would be, however, some calibration on the face of the gauge 240 in the region of the aperture 248 to simplify quantitative stress measurements. As was the case in certain of the previous embodiments, the gauge 240 also has a reflector 268 which is parallel to the mounting plane and may be used when no amplification is desired.

FIGS. 17-19 a photoelastic strain gauge 280 is depicted, which constitutes a yet further embodiment of the present invention. The gauge 280 includes a pair of parallel reflective sheets 282 and 284 with a slab of photoelastic material 286 therebetween. The unreflective portion of the top surface of the slab 286 constitutes an aperture 288. Aligned with the aperture 288 is a set of six reflectors 290a to 300a, respectively being at different angles of inclination to the mounting plane of the gauge 280. The reflector 290a is at the steepest angle, while the reflector 300a is at the shallowest angle. Adjacent to the other end of the slab 286 is a plurality of reflectors 290b to 300b, respectively longitudinally aligned with the reflectors 290a to 300a, and at angles twice the angles respectively of the reflectors 290a to 300a.

A light ray 302, at the lateral position shown, will strike the reflector 292a, to be reflected thereby and to be reverberated between the reflective sheets 282 and 284 until the ray 302 strikes the reflector 292b which retroreflects the ray along the same path to exit through the aperture 288. On the other hand, when a ray 304 is at the lateral position indicated, it will strike the reflector 298 and will be reflected thereby for reverberation between the sheets 282 and 284, until the ray strikes the reflector 298b which retroreflects the ray back along the same path until it strikes the reflector 298a and is reflected thereby to emerge through the aperture 288. It can be seen that the path of the ray 302 is shorter than the path of the ray 304. In other words, the shallower the angle of the reflectors, the greater the path length and therefore the greater the amplification.

Thus, there will appear in the aperture 288 a composite pattern representative of the stress in the workpiece to which the gauge 280 is bonded. In the region corresponding to the reflector 290a, a pattern resulting from slight amplification will appear, and the pattern aligned with the reflector 300a will be the result of substantial amplification. The comments made in respect to the embodiment of FIGS. 14 to 16, as to the characteristics of the patterns, are basically applicable to this embodiment also.

Turning now to FIGS. 20 and 21, there is depicted a photoelastic strain gauge 32o which incorporates another embodiment of the present invention. In this embodiment, the gauge 320 includes a pair of annular sheets of reflective material 324 and 326. The sheet 326 is substantially planar, while the sheet 324 has a shallow V-shaped cross section, with its apex substantially at the center. Disposed between the sheets 324 and 326 is a cylindrical slab of photoelastic material 328, the marginal area of which protrudes from such sheets. That portion of the top surface of the slab 328 which does not have a reflective material thereon constitutes an aperture 330 which is ring- or washer-shaped. Aligned with the aperture 330 is a frustoconical reflector 332.

The gauge 320 is bonded to the workpiece 42 in such a manner that its mounting plane is parallel to the workpiece surface 44, by means of cement 322.

A ray 334 enters the slab 328 by way of the aperture 330 and strikes the reflector 332 in such a direction to be reverberated between the sheets of reflective material 324 and 326, and to strike the opposing portion of the reflector 332 and emerge at the opposing portion of the aperure 330. The gauge 320 is a modified wedge shape, in that the cross-sectional dimension decreases toward the middle, so that the angle formed by the rays as they strike the reflective sheets 324 and 326 increases from right to left up to the center, and thereafter the angle again decreases. It is to be understood that the ray 334 is exemplary, whereas, in point of fact, polarized light will strike the entire aperture 330 simultaneously, and light will be reflected by all portions of the reflector 332 and reverberated by the sheets 324 and 326. Accordingly, there will appear in the aperture 330 visual patterns, as schematically represented by the lines 326 (FIG. 20). As in the other embodiments, these patterns are the result of the effect on the optical properties of the gauge 320 caused by stress in the workpiece 42. The increased path length of the ray 334 causes these patterns to be substantially amplified.

Turning now to FIGS. 22 to 26, there is depicted a photoelastic strain gauge 350 incorporating still another embodiment of the present invention. The gauge 350 is a parallelipiped, and is bonded to the workpiece surface 44 (FIG. 23), as are the previous embodiments, by means of cement 352. The munting plane of the gauge 350 is the lower surface of the parallelepiped which is shown to be spaced from the workpiece surface 44, although the spacing is very slight or nonexistent.

The gauge 350 comprises ten subgauges or sections 354a to 354j. The parts of the first section 354a bear numerals followed by the letter "a", while corresponding parts of the second section are identified by the same numerals followed by a "*b*", etc., corresponding parts of the tenth section bearing the same reference numerals followed by the letter "*j*". It is to be understood that each element of each section is not shown in the drawings, but, when considered in their entirety, the construction should be clear. The section 354*a* includes two substantially parallel sheets of reflective material 356*a* and 358*a* with a slab of photoelastic material 360*a* therebetween. The unreflective portion of the slab 360*a* constitutes an aperture 362*a* for light to enter into and exit from the slab 360*a*. Each section 354*a* also includes an initial reflector 364*a* and a terminal reflector 366*a*. A ray 368*a*, entering the aperture 362*a*, will strike the reflector 364*a* and be reflected thereby to a reflective sheet 356*a*, which in turn reflects the ray 368*a* against the other sheet 358*a*, etc., for continued reverberation between such sheets, the ray 368*a* ultimately striking the reflector 366*a* which retroreflects the ray along the same path ultimately to strike the reflector 364*a* and to emerge through the aperture 362*a*. Thus, it may be seen that the section 354*a* has virtually the same construction as the gauge depicted in FIGS. 1 to 5.

Each of the remaining sections 354*b* to 354*j* has a construction very similar to the construction of the section 354*a* and has a similar mode of operation.

The sections 354*a* and 354*b* has located side by side in the upper level of the gauge 350, while the sections 354*c* and 354*j* are located side by side, but in the lower level of the gauge 350. Actually, the botton sheet for the top sections 354*a* and 354*b* may be in common with the top sheets of reflective material of the lower sections 354*c* and 354*j*. Also, the sections 354*a* and 354*c* are vertically aligned, as are the sections 354*b* and 354*j*. However, the reflectors 364*a* and 364*c* are displaced longitudinally, so that the respective apertures 362*a* and 362*c* are longitudinally displaced. Similar remarks are pertinent in respect to the apertures 362*b* and 362*j*.

In each of the sections 354*a* to 354*c*, and 354*j*, the associated sheets of reflective material are substantially parallel to the mounting plane. Also, the initial reflectors 364*a* to 364*c*, and 364*j* and the terminal reflectors 366*a* to 366*c*, and 366*j* are constructed and arranged to cause the light reverberated between the associated reflective sheets to take place in planes parallel to a plane that is perpendicular to the mounting plane.

The sections 354*d* to 354*g* have basically the same construction as described in respect to the section 354*a*. The sections 354*d* and 354*e* are located at 90° with respect to each other and are located at a first level in the parallelepiped. The sections 354*f* and 354*g* are longitudinally displaced from the sections 354*d* and 354*e* and are located at a second level. The sections 354*f* and 354*g* are normal to each other.

The reflective sheets 356*d* to 356*g*, and 358*d* to 358*g* are parallel to the mounting plane. The reflectors 364*d* to 364*g* and 366*d* to 366*g* are constructed and arranged to cause the light reverberated between the associated reflective sheets 356*d* to 356*g* and 358*d* to 358*g* to take place in planes parallel to a plane that is perpendicular to the mounting plane and is at a predetermined angle to a plane perpendicular to the mounting plane. In this form, such angle is ±45° for the sections 354*d* and 354*e*, and ±45° for the sections 354*f* and 354*g*.

Each of the sections 354*h* and 354*i* has a construction substantially the same as the section 354*a*. They are located 90° with respect to each other, at the left end of the parallelepiped. The reflective sheets 356*h* and 356*i* and 358*h* and 358*i* are substantially perpendicular to the mounting plane. The initial reflectors 364*h* and 364*i* and the terminal reflectors 366*h* and 366*i* are respectively constructed, and arranged to cause reverberation between such reflective sheets to take place in planes parallel to a plane that is at a predetermined angle to the mounting plane. In the case of the section 354*h*, such angle is 45°, and, in the case of the section 354*i*, such angle is also 45°, but in the opposite direction.

The ten sections 354*a* to 354*j* have their apertures 362*a* to 362*j* in the top surface of the parallelepiped and therefore are illuminated simultaneously. Polarized rays are indicated respectively by the numerals 368*a* to 368*j*. There will thus appear in the apertures 362*a* to 362*j* visual patterns representative of the stress in the workpiece 42. The various kinds of stresses may be calculated by combining the readings in each of these ten apertures, in accordance with the following formulas, wherein "A" represents bending stress in one direction; "B" represents bending stress in the opposite direction; "C" represents tension (or compression, as the case may be); "D" represents shear stress in one direction; "E" represents shear stress in the opposite direction, and "F" represents torsion stress; $K_1$ to $K_6$ represent constants determined by the parameters of the photoelastic material; and the letters "*a–j*" represent the "readings" appearing in the apertures 362*a* to 362*j*:

$$A = K_1(a + c - j - b)$$

$$B = K_2(a + b - c - j)$$

$$C = K_3(a + b + j + c)$$

$$D = K_4(f + d - e - g)$$

$$E = K_5(i - h)$$

$$F = K_6(f + e - d - g)$$

Preferably, there will not be so many separate slabs, but rather a single piece or a few pieces of photoelastic material cast (if epoxy) to achieve the depicted end product.

Figure 31:
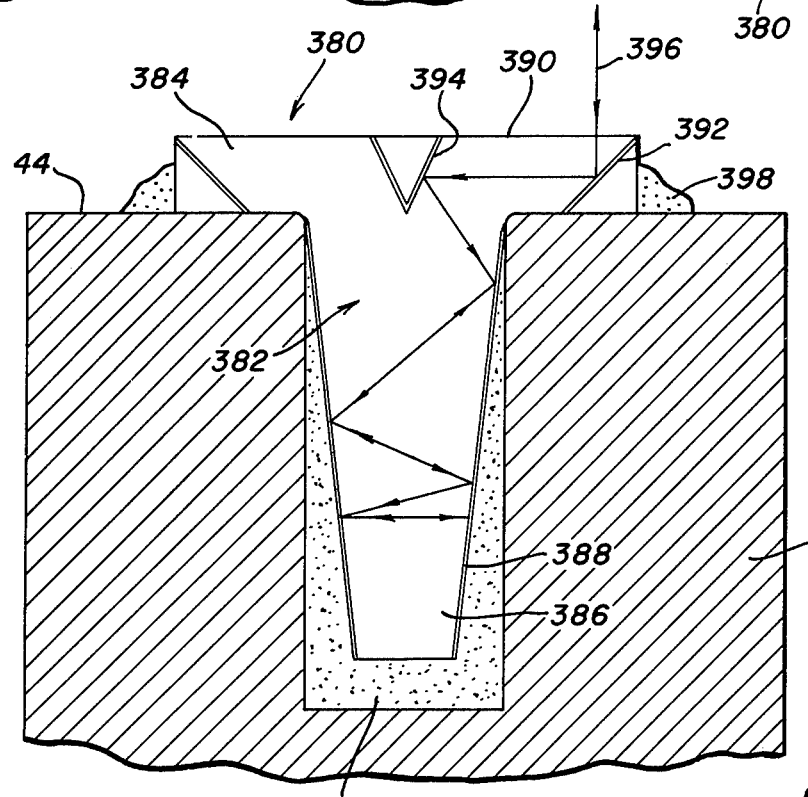
FIG. 31 is an enlarged view of a core taken from the workpiece with the strain gauge bonded thereto and depicting the path of a light ray in such gauge.
Figure 30:
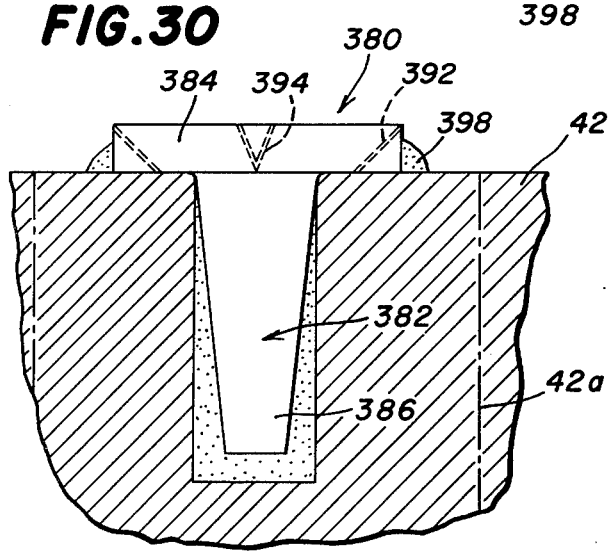
FIG. 30 is a view in vertical section taken along the line 30—30 of FIG. 29, on an enlarged scale.
Figure 32:
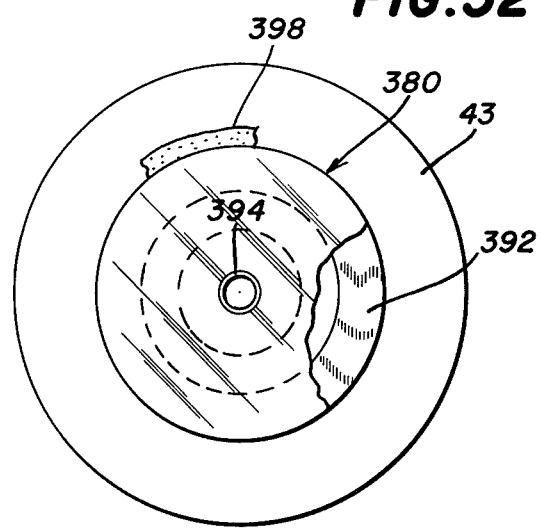
FIG. 32 is a top plan view of FIG. 31.

Turning now to FIGS. 27 to 32, there will be described a further embodiment of the present invention. Turning first to FIG. 31, the details of construction of the guages in this form of the invention will be described. The gauge bears the number 380 and includes a body 382 of photoelastic material having a head 384 which is in the form of a cylindrical slab, from which depends a stem 386 which is frustoconical in shape, its lateral area decreasing with increasing distance from the head 384. The outer surface of the stem 386 is covered with a sheet 388 of reflective material. The outer surface of the head 384 defines an aperture 390 through which light enters the body 382 and exits therefrom.

The photoelastic strain gauge 380 further comprises a first reflector 392 which is frustoconical, as shown, its angle inclination being preferably 45°. The gauge 380 includes a second reflector 394 embedded in the head 384, the reflector 394 being conical in shape with its apex depending toward the stem 386.

An incoming ray 396 passes through the aperture 390 and strikes the reflector 392, which is inclined so that the ray reflected therefrom is substantially horizontal, that is, parallel to the mounting plane. Such horizontal ray strikes the reflector 394 which reflects it in a direction to strike a point on the sheet of reflective material 388 which, in turn, reflects the ray to strike an opposite portion of such sheet. The ray reverberates between opposing portions of such sheet. As in earlier forms incorporating a wedge-shaped body of photoelastic material, the angle of reflection continues to increase until ultimately the ray is reflected along its own path, all as shown. The returning ray is reflected by the reflector 394 and then by the reflector 392 to exit through the aperture 390 as shown. The exiting ray 396 is exemplary of the other rays which will exit from the aperture 390 as the result of other incoming rays. Thus, there will appear in the aperture 390 visual patterns determined by the characteristic of the rays exiting at that point.

To measure stress, there is drilled into the workpiece 42 a tiny bore, for example, on the order of 1/32 inch, which has no destructive effect on the workpiece. The bore 45 is then filled with cement 398 and the strain gauge 380 is mounted thereon by inserting the stem 386 into the bore until the lower surface of the head 384 seats on the workpiece surface 44, whereupon the gauge 380 is effectively permanently mounted in place. Then a cylindrical cut represented by the phantom line 42a is made in the workpiece 42, and the core 43 bounded by the cut 42a is removed. The stress that was in the workpiece 42 and in the core 43 is substantially relieved by virtue of the core 43 being separated, the stress being transferred to the gauge 380. The photoelasticity of the gauge 380 affects the optical properties in the manner previously described as to the other forms, so that the light emitted or exiting from the aperture 390 presents patterns representative of the stress. Again, the reverberation of the light rays causes these patterns to be amplified substantially, so that stress of very small values may be evaluated. Although the operation of the gauge 380 has been explained by reference to the ray 396, it must be understood that the entire aperture 390 is illuminated by polarized light, the rays in such light being simultaneously reverberated between opposing portions of the reflective material 388, causing the entire aperture 390 to display the visual patterns.

An important advantage of the method and device described above is that it enables in situ stress analysis of a portion of the workpiece beneath its surface.

While there have been described what are presently considered to be preferred embodiments of the invention for illustrative purposes, the details of the structure are, nevertheless, capable of wide variation within the purview of the invention as defined in the appended claims.

What is claimed is:

1. A photoelastic strain gauge adapted to be bonded to a surface of a workpiece for displaying visual patterns representative of the strain in such workpiece, said strain gauge having a mounting plane adapted to be parallel to the workpiece surface, said strain gauge comprising two substantially parallel outer sheets of reflective material, a slab of photoelastic material between said outer sheets, an inner sheet of reflective material in said slab and being parallel to said outer sheets, said slab having an entry aperture for light to enter said slab and an exit aperture arranged to receive light which has passed through said slab to produce the visual patterns, first reflective means adjacent to one end of said slab for receiving light which has passed through said entry aperture and for directing such light at a predetermined angle so as to be reverberated within said slab between one of said outer sheets and said inner sheet, a further sheet of reflective material adjacent to the other end of said slab and being disposed substantially perpendicular to said inner and outer sheets and arranged to receive light which has been reverberated between said one outer sheet and said inner sheet and to reflect such light toward said second outer sheet for further reverberation between said second outer sheet and said inner sheets, and second reflective means adjacent to said one end of said slab for receiving light which has been reverberated by said sheets of reflective material and for directing such light to said exit aperture, thereby to increase the length of path of light through said slab so as to cause the visual patterns to be amplified, and to decrease the effects of bending and shear stresses in the workpiece.

2. The photoelastic strain gauge of claim 1, wherein said inner and outer sheets are substantially perpendicular to said mounting plane.

3. The photoelastic strain gauge of claim 1, wherein each of said reflective means includes two reflectors.

4. The photoelastic strain gauge of claim 1, wherein said inner sheet is substantially midway between said outer sheets.

5. The photoelastic strain gauge of claim 1, wherein said slab and said inner and outer sheets are elongated between said ends.

6. The photoelastic strain gauge of claim 5, wherein said first and second reflective means are substantially laterally aligned.

7. A photoelastic strain gauge adapted to be bonded to a surface of a workpiece for displaying visual patterns representative of the strain in such workpiece, said photoelastic strain gauge comprising two sheets of reflective material, at least one of said reflective sheets having a shallow V-shaped cross section, the apexes of said reflective sheets being aligned, a slab of photoelastic material between said reflective sheets, light being reverberated within said slab between said reflective sheets from one end of said slab toward the other end thereof, said slab having an entry aperture at one end thereof for light to enter into said slab and an exit aperture at the other end thereof to receive light which has passed through said slab to produce the visual patterns, a first reflector adjacent to said one end for receiving light which has passed through said entry aperture and for directing such light at a predetermined angle so as to be reverberated within said slab between said reflective sheets, and a second reflector in said slab adjacent to said other end and oriented to receive light which has been reverberated between said reflective sheets and to direct such light to said exit aperture.

8. The photoelastic strain gauge of claim 7, and further comprising an adjustable reflector adapted to be positioned adjacent to said exit aperture to retroreflect light exiting therethrough to said second reflector for further reflection to one of said reflective sheets for further reverberation between said reflective sheets to strike said first reflector and be reflected thereby to said entry aperture.

9. The photoelastic strain gauge of claim 7, wherein each of said reflective sheets has a shallow V-shaped cross section.

10. A photoelastic strain gauge adapted to be bonded to a surface of a workpiece for displaying a plurality of visual patterns representative of various aspects of the strain in such workpiece, said strain gauge having a mounting plane adapted to be parallel to the workpiece surface, said photoelastic strain gauge comprising a plurality of sections, each section including two substantially parallel sheets of reflective material, a slab of photoelastic material between said reflective sheets, light being reverberated within said slab between said reflective sheets from one end of said slab toward the other end thereof, said slab having an aperture adjacent to said one end thereof for light to enter into and to exit from said slab, first reflector means in said slab adjacent to said other end and oriented to receive light which has been reverberated between said reflective sheets and to retroreflect such light toward one of said reflective sheets for further reverberation therebetween, and second reflector means adjacent to said one end for directing light from said aperture toward said sheets of reflective material for reverberation therebetween and for directing light from said sheets of reflective material to said aperture, thereby to increase the length of the path through said slab to cause the visual patterns to be amplified, the sheets of reflective material in a first of said sections being substantially parallel to said mounting plane, the associated first and second reflector means being constructed and arranged to cause the light reverberated between the associated reflective sheets to take place in planes parallel to a first plane that is perpendicular to said mounting plane, the reflective sheets in a second of said sections being substantially parallel to said mounting plane, the associated first and second reflector means being constructed and arranged to cause the light reverberated between the associated reflective sheets to take place in planes parallel to a plane that is perpendicular to said mounting plane and is at a predetermined angle to said first plane of between 0° and 90°, the reflective sheets in a third of said sections being substantially perpendicular to said mounting plane, the associated first and second reflector means being constructed and arranged to cause the light reverberated between the associated reflective sheets to take place in planes parallel to a plane that is at a predetermined angle to said mounting plane of between 0° and 90°.

11. The photoelastic strain gauge of claim 10, wherein said predetermined angle in each case is about 45°.

12. The photoelastic strain gauge of claim 10, and further comprising three additional sections substantially identical to said first section, three additional sections substantially identical to said second section, and one additional section substantially identical to said third section.

13. A photoelastic strain gauge adapted to be bonded to a surface of a workpiece for displaying a plurality of visual patterns representative of various aspects of the strain in such workpiece, said strain gauge having a mounting plane adapted to be parallel to the workpiece surface, said photoelastic strain gauge comprising ten sections, each section including two substantially parallel sheets of reflective material, a slab of photoelastic material between said reflective sheets, light being reverberated within said slab between said reflective sheets from one end of said slab toward the other end thereof, said slab having an aperture adjacent to said one end thereof for light to enter into and to exit from said slab, first reflector means in said slab adjacent to said other end and oriented to receive light which has been reverberated between said reflective sheets and to retroreflect such light toward one of said reflective sheets for further reverberation therebetween, and second reflector means adjacent to said one end for directing light from said aperture toward said sheets of reflective material for reverberation therebetween and for directing light from said sheets of reflective material to said aperture, thereby to increase the length of the path through said slab to cause the visual patterns to be amplified, the sheets of reflective material in a first type of said sections being substantially parallel to said mounting plane, the associated first and second reflector means being constructed and arranged to cause the light reverberated between the associated reflective sheets to take place in planes parallel to a first plane that is perpendicular to said mounting plane, a first and a second of said first type of sections being located side by side, a third and a fourth of said first type of sections being located side by side on a second level, the reflective sheets in a second type of said sections being substantially parallel to said mounting plane, the associated first and second reflector means being constructed and arranged to cause the light reverberated between the associated reflective sheets to take place in planes parallel to a plane that is perpendicular to said mounting plane and is at a predetermined angle to said first plane of between 0° and 90°, a first and second of said second type of sections being located on one level and being 90° relative to each other, a third and a fourth of said second type of sections being located on a second level and being 90° with respect to each other, the reflective sheets in a third type of said sections being substantially perpendicular to said mounting plane, the associated first and second reflector means being constructed and arranged to cause the light reverberated between the associated reflective sheets to take place in planes parallel to a plane that is at a predetermined angle to said mounting plane of between 0° and 90°, a first and a second of said third type of sections being 90° relative to each other 14. The photoelastic strain gauge of claim 13, wherein said predetermined angle is in each case about 45°.

15. The photoelastic strain gauge of claim 13, wherein the aperture of each of said ten sections is located on a common surface.

16. A photoelastic strain gauge adapted to be bonded in a bore of a workpiece for displaying visual patterns representative of the strain in such workpiece, said photoelastic strain gauge comprising a body of photoelastic material having a head portion and a stem portion, a sheet of reflective material on said stem portion, light being reverberated within said stem portion between opposing portions of said reflective sheet, said head having an aperture for light to enter said body and for light to exit therefrom to produce the visual patterns, and means for receiving light which has passed through said aperture and for directing such light at a predetermined angle so as to be reverberated within said body between portions of said reflective sheet and for receiving light which has been reverberated and for directing such light through said aperture.

17. The photoelastic strain gauge set forth in claim 16, wherein said stem is frustoconically shaped with its cross sectional area decreasing with increasing distance from the head, whereby said light which is reverberated between portions of said reflective sheet automatically is reverberated in the reverse direction for being discharged by said receiving and directing means.

18. The photoelastic strain gauge of claim 16, wherein said head is a cylindrical slab.

19. The photoelastic strain gauge of claim 10, wherein said receiving and directing means includes a frusto conical first reflector in said head portion arranged at an angle of about 45° to the plane of the axis of said stem portion, and a conical mirror in said head portion arranged to receive light reflected by said first reflector and for redirecting such light to said reflective sheet for reverberation between the portions thereof.

20. A method of analyzing the stress in a workpiece by utilizing a strain gauge having a head portion and a stem portion, comprising the steps of drilling a hole in the workpiece, depositing cement in the hole, mounting the gauge by inserting its stem in the bore until its head seats on the surface of the workpiece, and drilling a core from the workpiece with the gauge thereon.

21. A photoelastic strain gauge adapted to be bonded to a surface of a workpiece for displaying visual patterns representative of the strain in such workpiece, said strain gauge having a mounting plane adapted to be parallel to the workpiece surface, said photoelastic strain gauge comprising two sheets of reflective material which converge toward each other, a slab of photoelastic material between said reflective sheets, said slab having an entry aperture at one end of said slab for light to enter said slab and an exit aperture arranged to receive light which has passed through said slab to produce the visual patterns, and means adjacent to said entry aperture for receiving light which has passed therethrough and for directing such light at a predetermined angle so as to be reverberated within said slab between said reflective sheets and to said exit aperture, thereby to increase the length of the path of light through said slab so as to cause the visual patterns to be amplified.

22. A photoelastic strain gauge adapted to be bonded to a surface of a workpiece for displaying visual patterns representative of the strain in such workpiece, said strain gauge having a mounting plane adapted to be parallel to the workpiece suface, said photoelastic strain gauge comprising two sheets of reflective material, at least one of said reflective sheets having a shallow v-shaped cross section, a slab of photoelastic material between said reflective sheets, said slab having an entry aperture for light to enter said slab and an exit aperture arranged to receive light which has passed through said slab to produce the visual patterns, and means for receiving light which has passed through said entry aperture and for directing such light at a predetermined angle so as to be reverbated within said slab between said reflective sheets and to said exit aperture, thereby to increase the length of the path of light through said slab so as to cause the visual patterns to be amplified.

23. A photoelastic strain gauge adapted to be bonded to a surface of a workpiece for displaying visual patterns representative of the strain in such workpiece, said strain gauge having a mounting plane adapted to be parallel to the workpiece surface, said photoelastic strain gauge comprising two sheets of reflective material which are substantially parallel to each other and substantially perpendicular to said mounting plane, a slab of photoelastic material between said reflective sheets, said slab having an entry aperture for light to enter said slab and an exit perture arranged to receive light which has passed through said slab to produce the visual patterns, and means for receiving light which has passed through said entry aperture and for directing such light at a predetermined angle so as to be reverberated within said slab between said reflective sheets and to said exit aperture, thereby to increase the length of the path of light through said slab so as to cause the visual patterns to be amplified.

24. A photoelastic strain gauge adapted to be bonded to a surface of a workpiece for displayin visual patterns representative of the strain in such workpiece, said strain gauge having a mounting plane adapted to be parallel to the workpiece surface, said photoelastic strain gauge comprising two sheets of reflective material, a slab of photoelastic material between said reflective sheets, said slab having an entry aperture for light to enter said slab and an exit aperture arranged to receive light which has passed through said slab to produce the visual patterns, means for receiving light which has passed through said entry aperture and for directing such light at a predetermined angle so as to be reverberated within said slab between said reflective sheets and to said exit aperture, thereby to increase the length of the path of light through said slab so as to cause the visual patterns to be amplified, and an additional reflective sheet arranged parallel to said mounting plane for producing unamplified visual patterns.

25. A photoelastic strain gauge adapted to be bonded to a surface of a workpiece for displaying visual patterns representative of the strain in such workpiece, said strain gauge having a mounting plane adapted to be parallel to the workpiece surface, said strain gauge comprising two sheets of reflective material, a slab of photoelastic material between said reflective sheets, light being reverberated within said slab between said reflective sheets from one end of said slab toward the other end thereof, said slab having an aperture adjacent to said one end thereof for light to enter into and to exit from said slab, a plurality of first reflectors in said slab adjacent to said other end and oriented to receive light which has been reverberated between said reflective sheets and to retroreflect such light toward one of said reflective sheets for further reverberation therebetween, and a planar second reflector adjacent to said one end for directing light from said aperture toward said sheets of reflective material for reverberation therebetween and for directing light from said sheets of reflective material to said aperture, thereby to increase the length of the path of light through said slab to cause the visual patterns to be amplified, each of said first reflectors being located at a different distance from said second reflector, the angle between said mounting plane and each of said first reflectors being substantially equal, whereby the visual patterns produced by virtue of light respectively reflected from said first reflectors provides a plurality of visual patterns each having a different amplification.

26. A photoelastic strain gauge adapted to be bonded to a surface of a workpiece for displaying visual patterns representative of the strain in such workpiece, said strain gauge having a mounting plane adapted to be parallel to the workpiece surface, said strain gauge comprising two sheets of reflective material, a slab of photoelastic material between said reflective sheets, light being reverberated within said slab between said reflective sheets from one end of said slab toward the other end thereof, said slab having an aperture adjacent to said one end thereof for light to enter into and to exit from said slab, a plurality of first reflectors respectively at different angles to said mounting plane, in said slab adjacent to said other end and oriented to receive light which has been reverberated between said reflective sheets and to retroreflect such light toward one of said reflective sheets for further reverberation therebetween, and a corresponding plurality of second reflectors respectively longitudinally aligned with said first reflectors and respectively at angles one half the angles of said first reflectors adjacent to said one end for directing light from said aperture toward said sheets of reflective material for reverberation therebetween and for directing light from said sheets of reflective material to said aperture, thereby to increase the length of the path of light through said slab to cause the visual patterns to be amplified.

* * * * *

UNITED STATES PATENT AND TRADEMARK OFFICE
CERTIFICATE OF CORRECTION

PATENT NO. : 4,123,158
DATED : October 31, 1978
INVENTOR(S) : Zinovy V. Reytblatt It is certified that error appears in the above-identified patent and that said Letters Patent are hereby corrected as shown below:

Column 3, line 52, "Finaly," should be --Finally,--.
Column 6, line 64, "reglec-" should be --reflec---.
Column 9, line 44, before "FIGS" insert --In--.
Column 10, line 19, "32o" should be --320--;
           line 51, "326" should be --336--;
           line 62, "munting" should be --mounting--.
Column 11, line 27, "has" should be --are--.
Column 12, line 47, "guages" should be --gauges--.
Column 16, line 67, "10" should be --16--.
Column 17, line 62, "perture" should be --aperture--.
Column 18, line 4, "displayin" should be --displaying--.

Signed and Sealed this

Twenty-seventh Day of March 1979

[SEAL]

Attest:

RUTH C. MASON
Attesting Officer

DONALD W. BANNER
Commissioner of Patents and Trademarks